United States Patent [19]
Stratakos et al.

[11] Patent Number: 6,020,729
[45] Date of Patent: Feb. 1, 2000

[54] DISCRETE-TIME SAMPLING OF DATA FOR USE IN SWITCHING REGULATORS

[75] Inventors: Anthony J. Stratakos, Fremont; David B. Lidsky, Oakland; William A. Clark, Fremont, all of Calif.

[73] Assignee: Volterra Semiconductor Corporation, Fremont, Calif.

[21] Appl. No.: 08/991,394

[22] Filed: Dec. 16, 1997

[51] Int. Cl.[7] .................................................. G05F 1/56
[52] U.S. Cl. ............................................ 323/283; 323/284
[58] Field of Search .................................... 323/222, 224, 323/265, 266, 282, 284, 285, 283; 307/491

[56] References Cited

U.S. PATENT DOCUMENTS

| | | | |
|---|---|---|---|
| 4,580,089 | 4/1986 | Grunsch et al. | 323/287 |
| 5,422,562 | 6/1995 | Mammano et al. | 323/282 |
| 5,523,676 | 6/1996 | Bach et al. | 324/103 |
| 5,646,513 | 7/1997 | Riggio, Jr. | 323/285 |

FOREIGN PATENT DOCUMENTS

| | | |
|---|---|---|
| 0 547 916 A2 | 6/1993 | European Pat. Off. . |
| WO 95/31033 | 11/1995 | WIPO . |

OTHER PUBLICATIONS

Severns et al., *Modern DC–to–DC Switchmode Power Converter Circuits,* Van Nostrand Reinhold Co., NY, 11–1977 (No date).
Lloyd Dixon, "Average Current Mode Control of Switching Power Supplies," *Unitrode Switching Regulated Power Supply Design Seminar Manual,* Unitrode Corporation, C1–1 to C1–14, 1991.
Lloyd Dixon, "Switching Power Supply Topology Review," *Unitrode Switching Regulated Power Supply Design Seminar Manual,* Unitrode Corporation, P1–1 to P1–11, 1991.
Kassakian et al., "DC/DC Converters," *Principles of Power Electronics,* Addison–Wesley Publishing Co., Sec. 2.3, 20–23, 1991.
Kassakian et al., "High–Frequency Switching dc/dc Converters," *Principles of Power Electronics,* Addison–Wesley Publishing Co., Chapter 6, 103–137, 1991.
Kassakian et al., "Dynamics and Control: An Overview," *Principles of Power Electronics,* Addison–Wesley Publishing Co., Chapter 11, 253–298, 1991.
Kassakian et al., "Discrete–Time or Sampled–Data Models," *Principles of Power Electronics,* Addison–Wesley Publishing Co., Sec. 12.5, 313–315, 1991.
Kassakian et al., "Feedback Control Design," *Principles of Power Electronics,* Addison–Wesley Publishing Co., Chapter 14, 365–402, 1991.

*Primary Examiner*—Adolf Deneke Berhane
*Attorney, Agent, or Firm*—Fish & Richardson P.C.

[57] ABSTRACT

A voltage regulator with a switch to alternately couple and decouple an input terminal to an output terminal with a variable duty cycle and a filter disposed between the input terminal and the output terminal to provide a substantially DC voltage at the output terminal. A sampling circuit makes measurements of an electrical characteristic of the voltage regulator at discrete moments of time, such as just before the opening and closing of the switch. A feedback circuit is coupled to the sampling circuit and the switch, and is configured to use the measurements to control the duty cycle to maintain the DC voltage substantially constant. The feedback circuit uses the switch as the resistive element in order to measure the current passing through the voltage regulator.

25 Claims, 7 Drawing Sheets

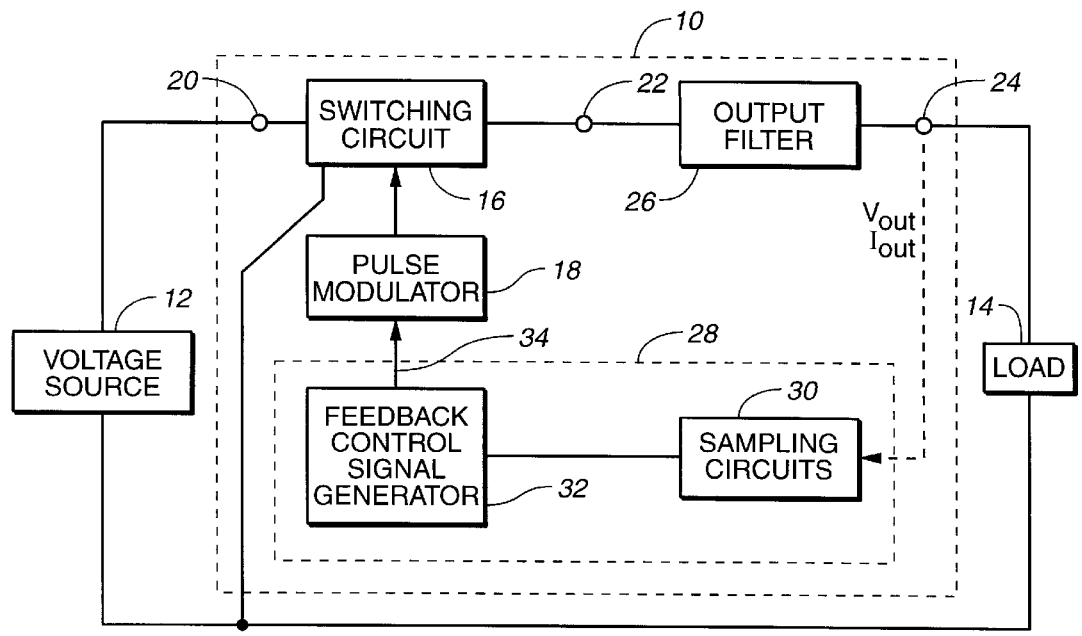
FIG._1
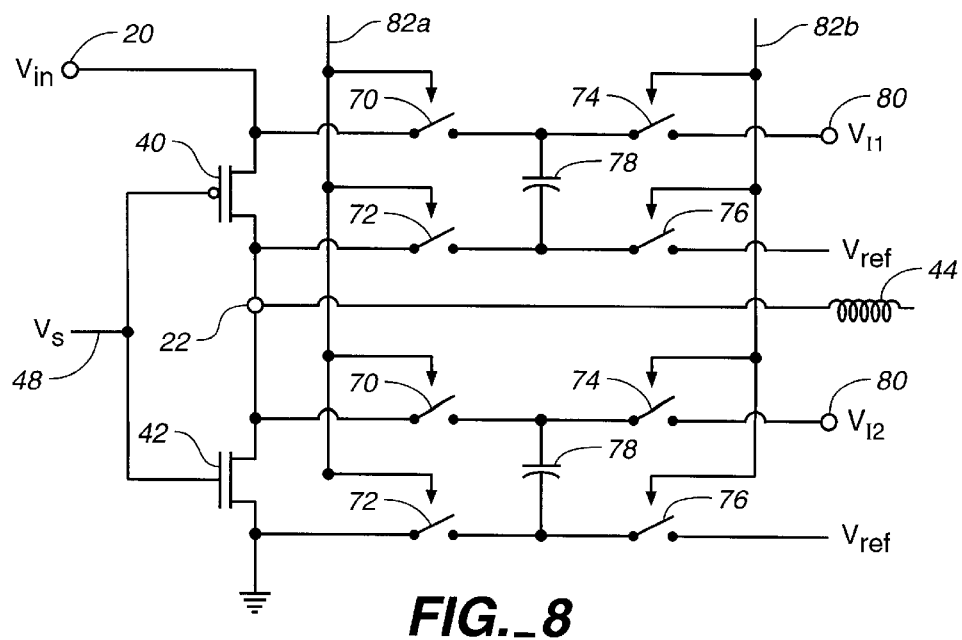
FIG._8

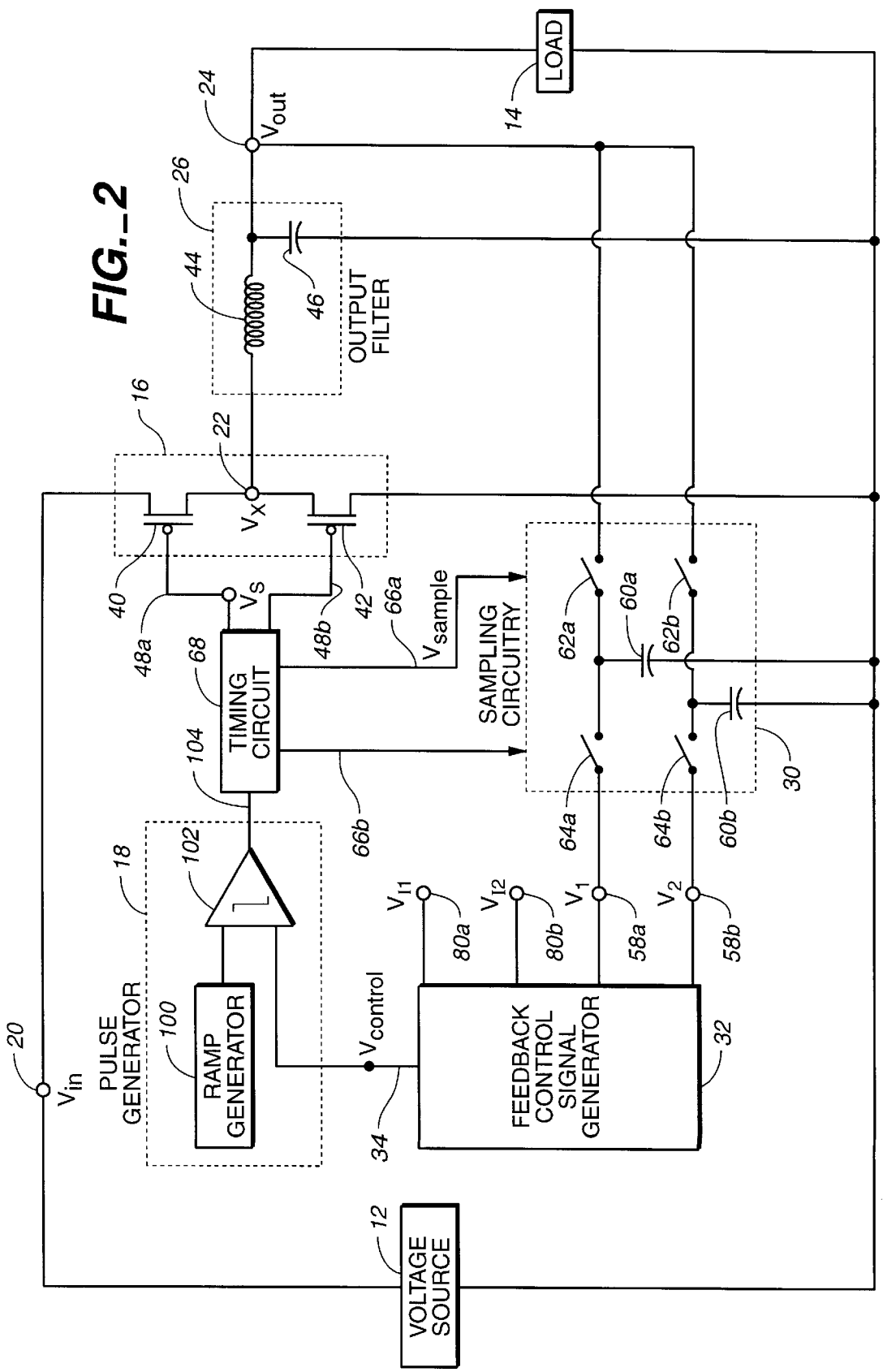
FIG._2

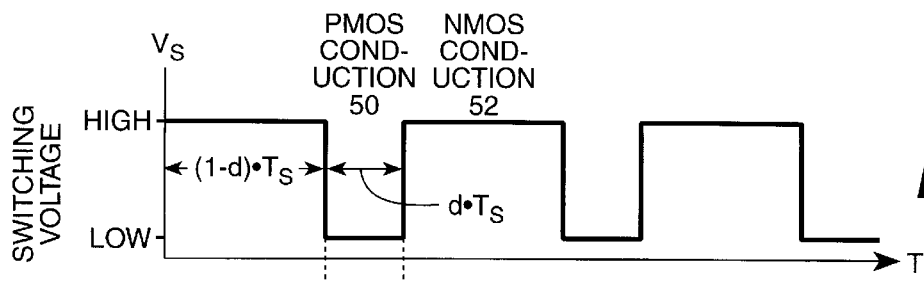
FIG._3
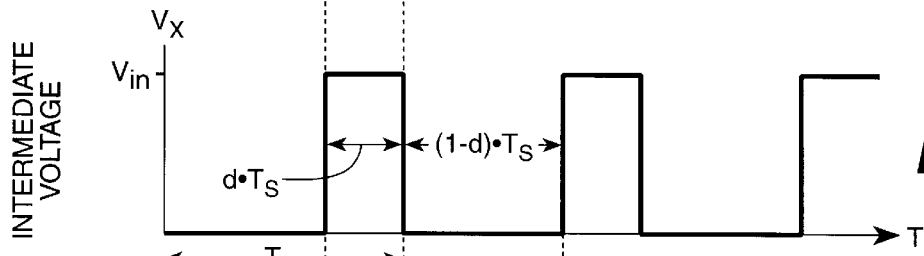
FIG._4
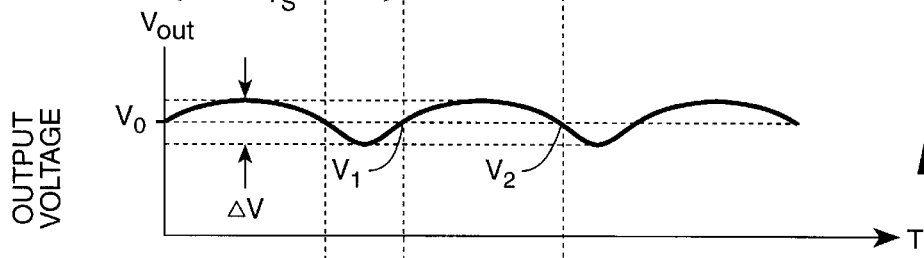
FIG._5
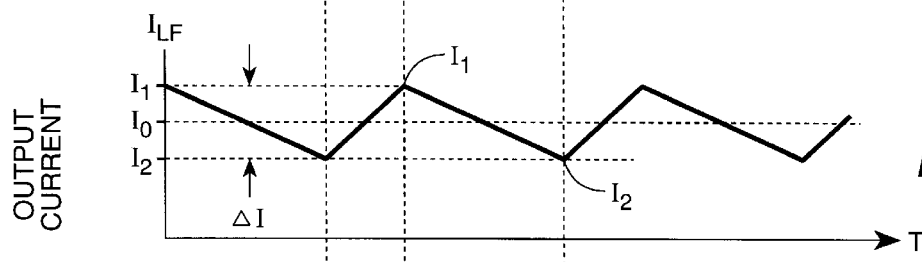
FIG._6
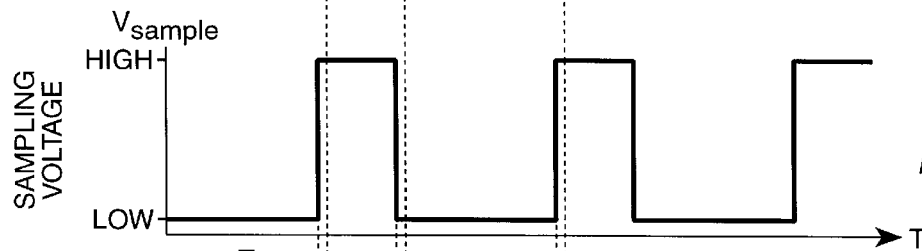
FIG._7
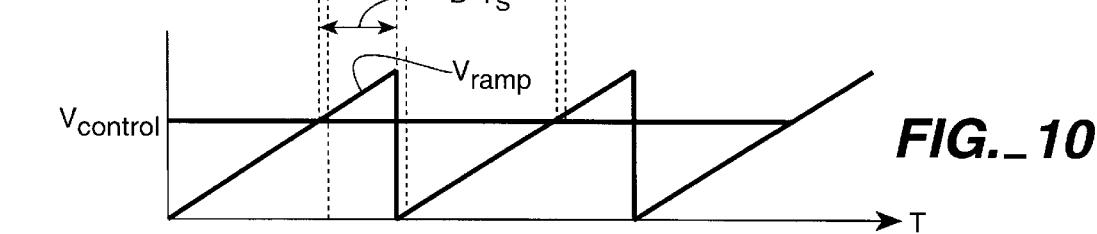
FIG._10

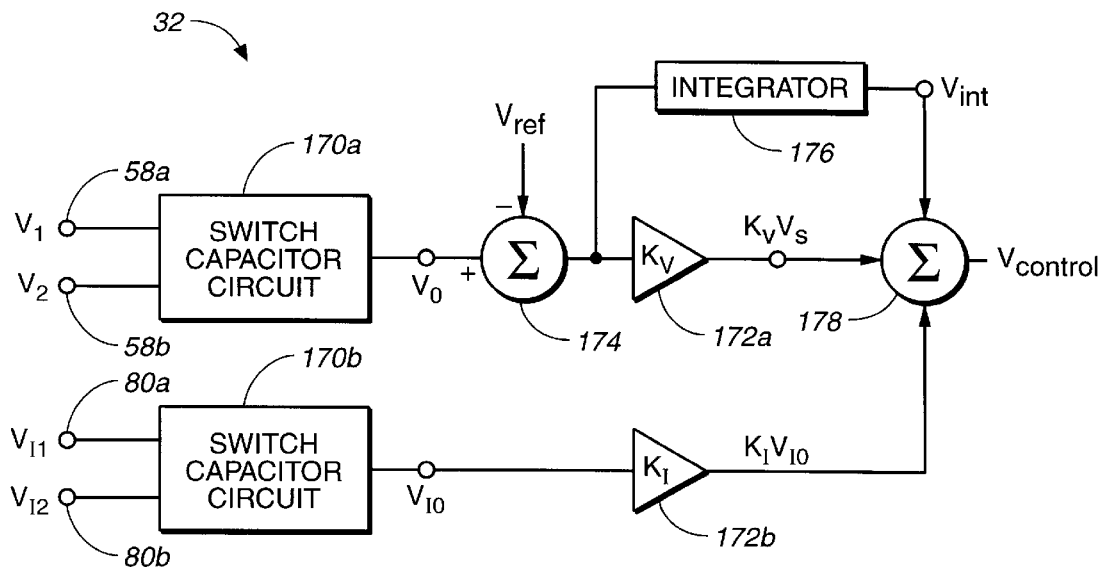
FIG._9
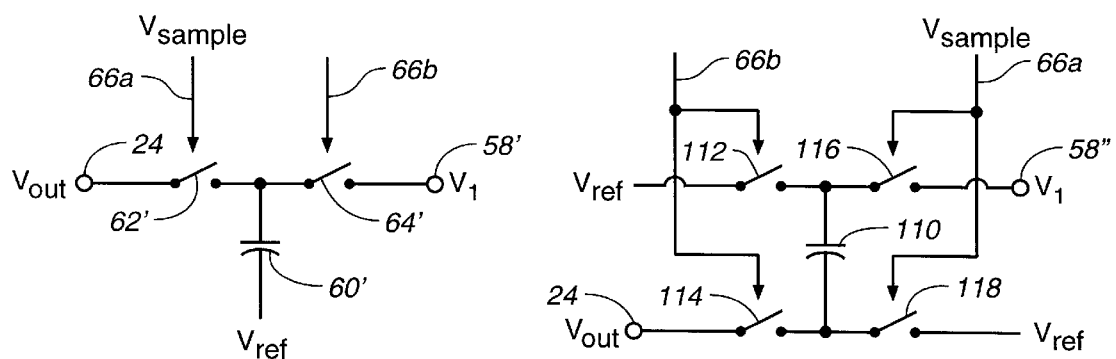
FIG._11A  FIG._11B

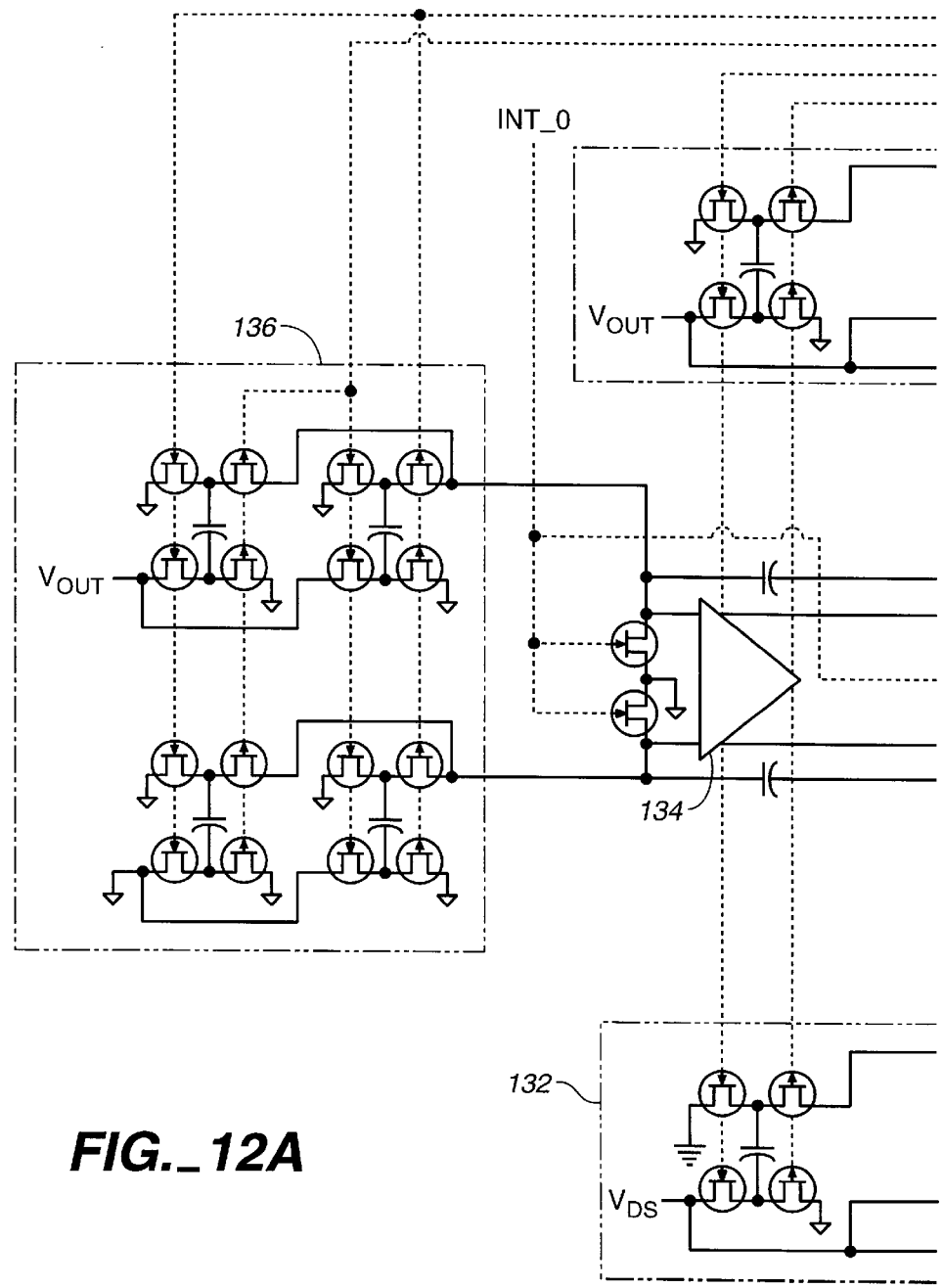
FIG._12A
FIG._12
FIG._12A | FIG._12B

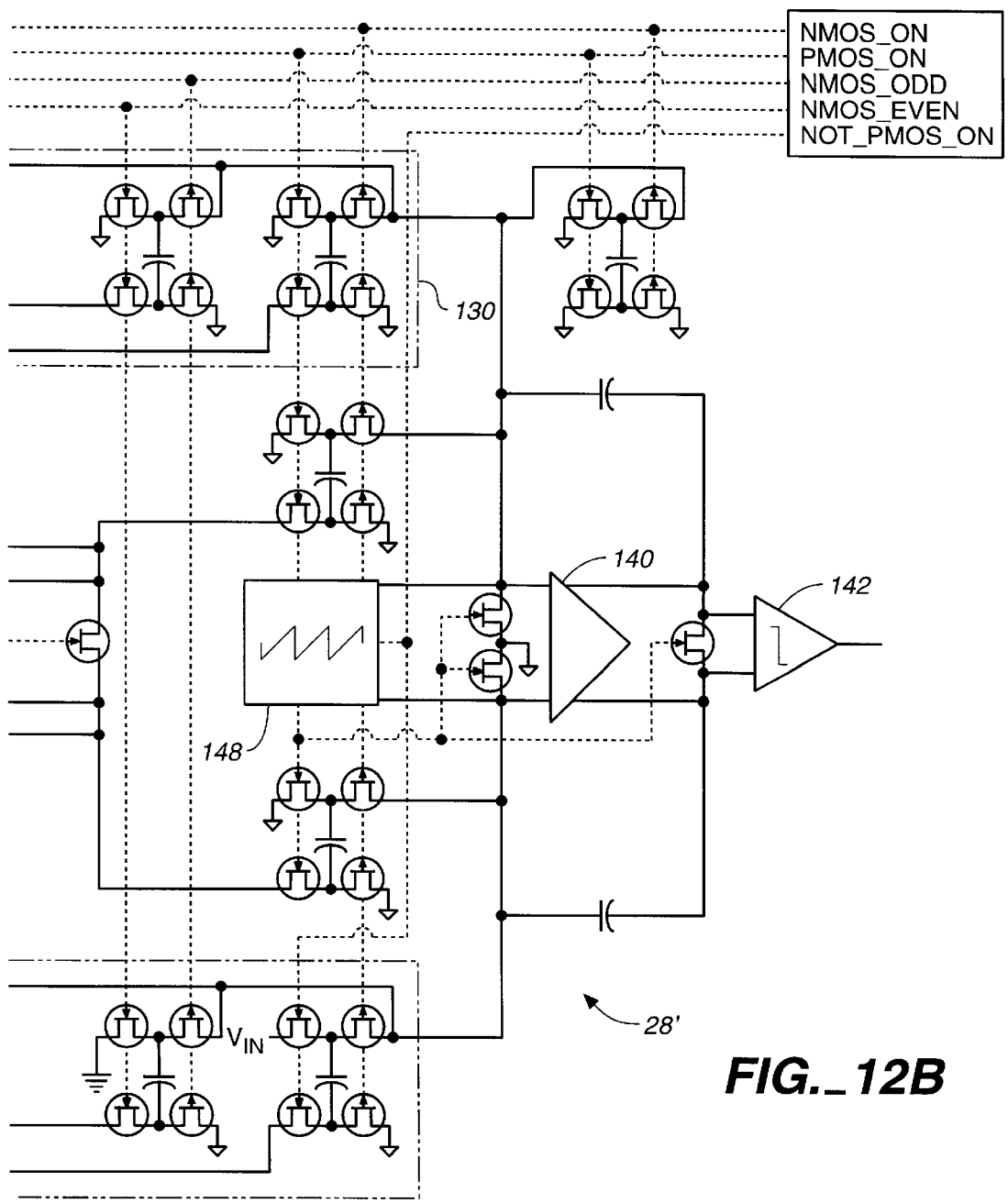
FIG._12B

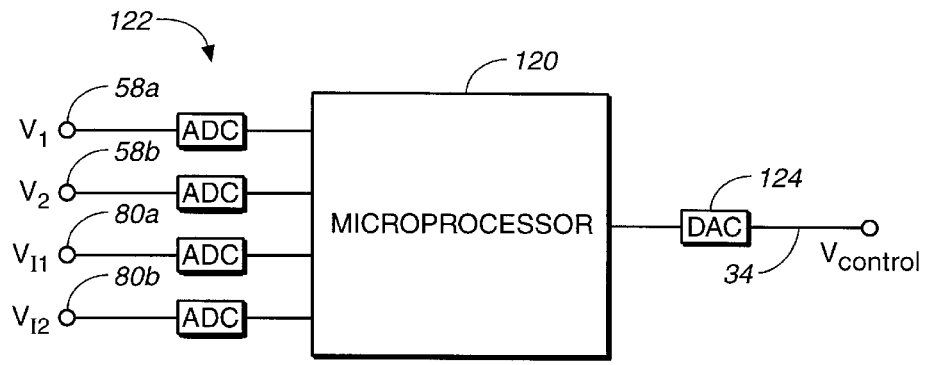
FIG._13
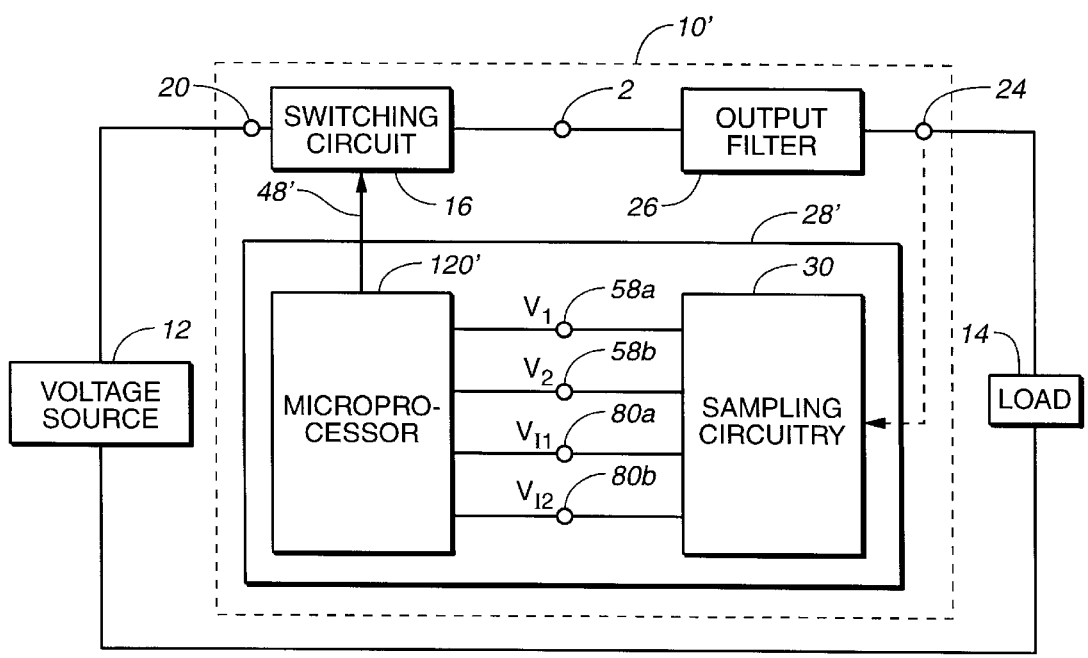
FIG._14

DISCRETE-TIME SAMPLING OF DATA FOR USE IN SWITCHING REGULATORS

BACKGROUND

The present invention relates generally to voltage regulators, and more particularly to control systems for switching voltage regulators.

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or simply "switching regulators") are known to be an efficient type of DC to DC converter. A switching regulator generates an output voltage by converting an input DC voltage into a high frequency voltage, and filtering the high frequency input voltage to generate the output DC voltage. Specifically, the switching regulator includes a switch for alternately coupling and decoupling an unregulated input DC voltage source, such as a battery, to a load, such as an integrated circuit. An output filter, typically including an inductor and a capacitor, is coupled between the input voltage source and the load to filter the output of the switch and thus provide the output DC voltage. The switch is typically controlled by a pulse modulator, such as a pulse width modulator or a pulse frequency modulator, which controls the switch. A feedback circuit generates a control signal which controls the duty cycle of the pulse modulator in order to maintain the output voltage at a substantially uniform level.

In traditional switching regulators, the feedback controller continuously measures the output voltage and uses this measurement to continuously generate a control signal for the pulse modulator. Such a continuous feedback controller operates using analog circuits, such as resistors, capacitors and op-amps. Unfortunately, these analog circuits are expensive and/or difficult to fabricate as integrated circuits. Specifically, special techniques are needed to fabricate resistors in semiconductor devices. In addition, these analog circuits do not easily interface with any digital circuits that may be fabricated in the same semiconductor device.

SUMMARY

In one aspect, the invention is directed to a voltage regulator having an input terminal to be coupled to an input voltage source and an output terminal to be coupled to a load. The voltage regulator includes a power switch to alternately couple and decouple the input terminal to the output terminal with a variable duty cycle, a filter disposed between the input terminal and the output terminal to provide a substantially DC voltage at the output terminal, a sampling circuit to make measurements of an electrical characteristic of the voltage regulator at discrete moments of time, and a feedback circuit coupled to the sampling circuit and the power switch, the feedback circuit configured to use the measurements to control the duty cycle to maintain the DC voltage substantially constant.

Implementations of the invention may include the following. The electrical characteristic may be a voltage at the output terminal or a current passing through the filter. The sampling circuit may include a capacitor, a first sampling switch connecting the capacitor to the output terminal, and a second sampling switch connecting the capacitor to the feedback circuit, so that the measurement is made when the first sampling switch opens, is stored as a charge in the capacitor, and is provided to the feedback circuit when the second sampling switch closes. Alternately, the sampling circuit may include a capacitor, a first sampling switch connecting a first plate of the capacitor to a first terminal of the power switch, a second sampling switch connecting a second plate of the capacitor to a second terminal of the power switch, and a third sampling switch connecting the capacitor to the feedback circuit, so that the measurement is made when the first and second sampling switches open, is stored as a charge in the capacitor, and is provided to the feedback circuit when the third sampling switch closes. The sampling circuit may make the measurement just prior to the power switch opening and/or closing. The sampling circuit may make a first measurement of the electrical characteristic when the power switch is closed and make a second measurement of the electrical characteristic when the power switch is open. The feedback circuit may use an average of the first and second measurements to control the duty cycle. The sampling circuitry may include a capacitor, a first sampling switch connecting the capacitor to an electrical path between the input terminal and the output terminal, and a second sampling switch connecting the capacitor to the feedback circuit. The second sampling switch may be configured to close when the first sampling switch open, and the first sampling switch may be configured to open just before the power switch opens and/or closes. The power switch may be driven by a switching voltage waveform and the sampling switches may be driven by a sampling voltage waveform, and the voltage regulator may further include a timing circuit to delay the switching voltage waveform relative to the sampling voltage waveform, e.g., by approximately the time constant delay of the sampling circuit. The feedback circuit may generate a control signal, and the voltage regulator may further include a pulse modulator connected to the feedback circuit and the power switch to set the duty cycle in response to the control signal. The feedback circuit may include one or more switched-capacitor circuits coupled to the sampling circuit to convert the measurement into a charge and to generate the control signal from the charge. The sampling circuit may include an analog-to-digital converter (ADC) coupled to the sampling circuit to convert the measurement into a digital signal, and a processor coupled to the ADC to generate the control signal from the digital signal. The power switch may include a first switch connecting the input terminal to an intermediate terminal and a rectifier, such as a second switch, connecting the intermediate terminal to ground, and the output filter may be connected between the intermediate terminal and the output terminal.

In another aspect, the invention is directed to a voltage regulator having an input terminal to be coupled to an input voltage source and an output terminal to be coupled to a load. The voltage regulator includes a power switch to alternately couple and decouple the input terminal to the output terminal with a variable duty cycle, a filter disposed between the switch and the output terminal to provide a substantially DC voltage at the output terminal, a sampling circuit to make a measurement of a current passing through the output filter, and a feedback circuit connected to the sampling terminal and the power switch configured to use the measurement to control the duty cycle to maintain the DC voltage at a substantially constant level. The sampling circuit includes a capacitor, a first sampling switch connecting a first plate of the capacitor to a first terminal of the power switch, a second sampling switch connecting a second plate of the capacitor to a second terminal of the power switch, and a third sampling switch connecting the capacitor to a sampling terminal.

Advantages of the invention may include the following. The feedback controller of the voltage regulator uses a discrete-time data sampling system to control the pulse modulator. Such a feedback controller may be implemented using digital and/or switched-capacitor based circuitry, and may be fabricated using known processes suitable for complimentary metal oxide semiconductor (CMOS) fabrication techniques. This reduces the number of discrete (off-chip) components in the controller. The invention permits the feedback controller to be implemented using an analog-to-digital converter and a micro-processor so that the duty cycle of the switch may be controlled by a software-implemented algorithm. In addition, the use of digital designs and traditional CMOS fabrication techniques permit the voltage regulator to be constructed more cheaply. Furthermore, the discrete times at which the voltage and current are sampled may be selected to provide a high accuracy and a minimum amount of switching noise.

BRIEF DESCRIPTION OF THE DRAWINGS

FIG. 1 is a block diagram of a switching regulator in accordance with the present invention.

FIG. 2 is a schematic circuit diagram of one embodiment of the switching regulator of FIG. 1.

FIG. 3 is a timing diagram showing the switching voltage from the pulse modulator of the switching regulator of FIG. 2.

FIG. 4 is a timing diagram showing the intermediate voltage at the intermediate terminal of the switching regulator of FIG. 2.

FIG. 5 is a timing diagram showing the output voltage at the output terminal of the switching regulator of FIG. 2.

FIG. 6 is a timing diagram showing the current through the output filter of the switching regulator of FIG. 2.

FIG. 7 is a timing diagram showing the sampling voltage to drive the sampling circuits of the switching regulator of FIG. 2

FIG. 8 is a schematic circuit diagram showing a discrete-time current-sampler from the feedback controller of the switching regulator of FIG. 2.

FIG. 9 is a schematic diagram showing a feedback control signal generator from the feedback controller of the switching regulator of FIG. 2.

FIG. 10 is a timing diagram of the ramp voltage and control voltage input to the pulse modulator of the switching regulator of FIG. 2.

FIG. 11A and 11B are schematic circuit diagrams showing alternate embodiments of the discrete-time voltage sampler.

FIG. 12 is a schematic diagram of an alternate embodiment of a feedback controller.

FIG. 13 is a schematic diagram of an another alternate embodiment of a feedback controller.

FIG. 14 is a schematic diagram of another embodiment of the switching regulator of FIG. 1.

DETAILED DESCRIPTION

Referring to FIG. 1, a switching regulator 10 is coupled to an unregulated DC input voltage source 12, such as a battery, by an input terminal 20. The switching regulator 10 is also coupled to a load 14, such as an integrated circuit, by an output terminal 24. The switching regulator 10 serves as a DC-to-DC converter between the input terminal 20 and the output terminal 24. The switching regulator 10 includes a switching circuit 16 which serves as a power switch for alternately coupling and decoupling the input terminal 20 to an intermediate terminal 22. The switching circuit 16 includes a rectifier, such as a switch or diode, coupling the intermediate terminal 22 to ground. The switching regulator also includes a pulse modulator 18 for controlling the operation of the switching circuit 16. The pulse modulator 18 causes the switching circuit 16 to generate an intermediate voltage having a rectangular waveform at the intermediate terminal 22. Although the pulse modulator 18 and the switching circuit 16 will be illustrated and described below as a pulse width modulator, the invention is also applicable to various pulse frequency modulation schemes.

The intermediate terminal 22 is coupled to the output terminal 24 by an output filter 26. The output filter 26 converts the rectangular waveform of the intermediate voltage at the intermediate terminal 22 into a substantially DC output voltage at the output terminal 24. Although the switching circuit 16 and the output filter 26 will be illustrated and described below for a buck converter topology, the invention is also applicable to other voltage regulator topologies, such as a boost converter or a buck-boost converter topology.

The output voltage is regulated, or maintained at a substantially constant level, by a feedback circuit 28. The feedback circuit 28 includes sampling circuitry 30 which measures the output voltage and the current passing through the output terminal 24 at discrete times during each cycle of the switching circuit 16. The measured voltage and current are input to a feedback control signal generator 32. The feedback control signal generator 32, in turn, generates a control voltage on a duty cycle control line 34 to control the pulse modulator 18. The sampling circuitry 30 and the feedback control signal generator 32 may be constructed utilizing entirely digital and switched-capacitor based components. Thus, most of the switching regulator 10, including the switching circuit 16, the pulse modulator 18, and the feedback circuit 28, may be implemented or fabricated on a single chip utilizing conventional CMOS techniques. Each of the elements in the switching regulator 10, i.e., the switching circuit 16, the pulse modulator 18, the output filter 26, the sampling circuitry 30, and the feedback control signal generator 32, will be discussed in greater detail below.

Referring to FIG. 2, the switching circuit 16 and the output filter 26 are configured in a buck converter topology. Specifically, the switching circuit 16 includes a switch, such as a first transistor 40 having a source connected to the input terminal 20 and a drain connected to the intermediate terminal 22, and a rectifier, such as a second transistor 42 having a source connected to ground and a drain connected to the intermediate terminal 22. The first transistor 40 may be a P-type MOS (PMOS) device, whereas the second transistor 42 may be an N-type MOS (NMOS) device. Alternately, the second transistor 42 may be replaced or supplemented by a diode to provide rectification. Also, both transistors may be NMOS devices. The first and second transistors 40 and 42 may be driven by a switching voltage $V_S$ on switching lines 48a and 48b.

Referring to FIG. 3, the pulse modulator generates a switching voltage $V_S$ having a rectangular waveform. The switching voltage $V_S$ has a frequency, $F_S$, of $1/T_S$ and a variable duty cycle, d, which is controlled by the feedback control signal generator. The duty cycle d is percentage of each period $T_S$ that the switching voltage is on, i.e., low. The frequency $F_S$ of the switching voltage may be in the range of about ten kilohertz to several megahertz. When the switching voltage $V_S$ is low, the first transistor is closed and the second transistor is open (PMOS conduction period 50), whereas if the switching voltage $V_S$ is high, the first transistor is open and the second transistor is closed (NMOS conduction period 52). Thus, during the PMOS conduction period 50, the intermediate terminal is connected to the input terminal, whereas during the NMOS conduction period 52, the intermediate terminal is connected to ground. Although not illustrated, the switching voltages on the switching lines 48a and 48b may be triggered by conventional techniques so that the PMOS and NMOS conduction periods 50 and 52 are separated by a dead time to ensure that both switches are not open simultaneously.

Referring to FIG. 4, the resulting intermediate voltage $V_X$ at the intermediate terminal is a rectangular waveform having a variable duty cycle d (the percentage of the cycle in which the intermediate terminal is connected to the input terminal) and a constant frequency $F_S$.

Returning to FIG. 2, the intermediate voltage $V_X$ is filtered by the output filter 26 to generate an output voltage $V_{out}$ at the output terminal 24. The output filter 26 includes an inductor 44 connected between the intermediate terminal 22 and the output terminal 24 and a capacitor 46 connected in parallel with the load 14. During the PMOS conduction period, the voltage source 12 supplies energy to the load 14 and the inductor 44 via the first transistor 40. On the other hand, during the NMOS conduction period, the energy is supplied by the inductor 44. The resulting output voltage $V_{out}$ is a substantially DC voltage. The average voltage $V_0$ of the output voltage $V_{out}$ is given by the product of the input voltage $V_{in}$ and the duty cycle d, i.e., $V_o = d \times V_{in}$. The average output current $I_o$ passing through the output terminal 24 is given by the average voltage $V_o$ divided by the effective resistance $R_o$ of the load, i.e., $I_o = V_o/R_o$.

Unfortunately, the actual output voltage $V_{out}$ is not exactly equal to the average voltage $V_0$. Referring to FIG. 6, the output voltage $V_{out}$ will include a ripple $\Delta V$ which is given by the following equation:

$$\Delta V \approx \frac{V_0 \cdot (1-d)}{8 \cdot L_f \cdot C_f \cdot f_s^2}$$

where d is the duty ratio, $L_f$ is the inductance of the inductor 44, $C_f$ is the capacitance of the capacitor 46, and $f_S$ is the switching frequency.

Similarly, the actual output current $I_{out}$ is not exactly equal to the average current $I_o$.

Referring to FIG. 6, the output current $I_{out}$ will be a triangular waveform with a period $T_S$ and a peak-to-peak ripple $\Delta I$ which has its maximum and minimum peaks equidistant from the average load current 10. The peak-to-peak ripple $\Delta I$ is given by the following equation:

$$\Delta I = \frac{V_0 \cdot (1-d)}{L_f \cdot f_s}$$

where d is the duty cycle, $L_f$ is the inductance of the inductor 44, and $f_S$ the switching frequency.

As previously discussed, the switching regulator includes sampling circuitry to measure the output voltage $V_{out}$ and the output current $I_{out}$. The sampling circuitry measures the output voltage at one or more discrete times during each cycle of the switching circuit. The sampling circuitry also measures the output current at one or more discrete times during each cycle of the switching circuit. However, since the output current cannot be measured directly, the sampling circuitry may actually measure a voltage difference which is representative of output current. Nevertheless, some of the description which follows is phrased as if the current were measured directly.

The feedback control signal generator uses the measured voltages and currents to determine the average output voltage $V_0$ and average output current $I_0$. The average output voltage $V_0$ and average output current $I_0$ are used to control the duty cycle of the power switch. It should be noted that the feedback circuit may use the voltage and current measurements to control the power switch without the intermediate step of determining the average values. Some of the description which follows is phrased as if the average values are calculated and provided as separate signals, although, as noted, this is not necessarily the case.

Referring to FIGS. 4, 5 and 6, the maximum output current $I_{out}$ is reached at the end of the PMOS conduction period 50 and the minimum output current $I_{out}$ is reached at the end of the NMOS conduction period 52. In addition, the output voltage $V_{out}$ passes through its average value at the end of the PMOS and NMOS conduction periods 50 and 52. Therefore, in order to estimate the average output voltage $V_0$, a first voltage measurement $V_1$ is made at the end of the PMOS conduction period 50, a second voltage measurement $V_2$ of the output voltage is made at the end of the NMOS conduction period 52, and the two measurements are averaged. Similarly, to estimate the average output current $I_o$, a first representative measurement $V_{I1}$ of the current $I_1$ is made at the end of the PMOS conduction period 50, a second current measurement $V_{I2}$ representative of the current $I_2$ is made at the end of the NMOS conduction period 52, and the two measurements are averaged. Because switching noise occurs when the transistors are switched on or off, if the measurements are made just before the switching voltage VS changes, there is a minimum amount of switching noise in the average current and voltage.

Returning to FIG. 2, a significantly simplified voltage sampler is shown. Current sampling is not shown explicitly in FIG. 2; it will be explained with reference to FIG. 8. The sampling circuitry 30 includes two voltage sampling capacitors 60a and 60b that are connected to the output terminal 24 by two voltage sampling switches 62a and 62b, respectively. The voltage sampling capacitors 60a and 60b may be connected by additional sampling switches 64a and 64b to the feedback control signal generator 32 via voltage sampling terminals 58a and 58b. The sampling switches may be configured so that switches 64a and 62b are closed when switches 62a and 62b are open, and vice-versa. While switch 62a is closed and switch 64a is open, current flows from the output terminal 24 into voltage sampling capacitor 60a. However, when switch 62a is opened and switch 64b is closed, the output voltage stored in voltage sampling capacitor 60a in the form of a charge is transferred onto voltage sampling terminal 58a to provide the first voltage measurement $V_1$. Similarly, while switch 62b is closed and switch 64b is open, current flows into voltage sampling capacitor 60b, but when switch 62b is opened and switch 64b is closed, the output voltage stored in voltage sampling capacitor 60b is transferred onto voltage sampling terminal 58b to provide the second voltage measurement $V_2$. Sampling switches 62a, 62b, 64a and 64b are driven by a sampling voltage $V_{sample}$ on sampling control lines 66a and 66b.

Referring to FIG. 7, the sampling voltage waveform $V_{sample}$ switches between high and low states just before the end of the PMOS conduction cycle and the NMOS conduction cycle. Although not shown explicitly, the sampling voltage on control lines 66a and 66b may be offset so that switches 62a, 62b and 64a, 64b are not open simultaneously.

Returning to FIG. 2, the switching lines 48*a* and 48*b* and the sampling control lines 66*a* and 66*b* may be connected to a timing circuit 68. The timing circuit 68 delays the switching voltage waveform $V_S$ relative to the sampling voltage waveform $V_{sample}$ to ensure that sampling occurs just before the transistors 40 and 42 flip in order to minimize noise. Thus, voltage sampling terminal 58*a* provides the first voltage $V_1$ measured at the end of the PMOS conduction period, and voltage sampling terminal 58*b* provides the second voltage $V_2$ measured at the end of the NMOS conduction period. The sampling voltage waveform $V_{sample}$ may be offset from the switching voltage waveform $V_S$ by a delay $T_D$ which is approximately equal to the time constant delay of the sampling circuit, i.e., about the time required by the sampling circuitry 30 to take the voltage and current measurements. The delay $T_D$ may be on the order of several nanoseconds. Preferably, the delay $T_D$ is larger than the time required to sample voltage and current.

As previously mentioned, sampling circuitry 30 also measures the output current $I_{out}$ at the end of the PMOS conduction period and the end of the NMOS conduction period. The current passing through the output terminal 24 is equal to the inductor current $I_{LF}$ passing through the inductor 44. However, the inductor current $I_{LF}$ cannot be measured directly; it must be inferred from a voltage measurement taken across a resistive element through which the current passes.

The sampling circuitry 30 includes a current sampler, one implementation of which is shown in FIG. 8. In this implementation, the current sampler uses the first and second transistors 40 and 42 as the resistive elements for the measurement of the inductor or output current. For each transistor 40 and 42, the sampling circuitry includes four current sampling switches 70, 72, 74 and 76, and a current sampling capacitor 78. The top plate of the current sampling capacitor 78 is connected to the source of the transistor (i.e., the input terminal 24 for the first transistor 40 and ground for the second transistor 42) by the first current sampling switch 70. Similarly, the bottom plate of the current sampling capacitor 78 is connected to the drain of the transistor (i.e., the intermediate terminal 22 for both the first and second transistors 40 and 42) by the second current sampling switch 72. The top plate of the current sampling capacitor 78 is coupled to a current sampling terminal 80 by the third current sampling switch 74, and the bottom plate of the current sampling capacitor 78 is connected to a reference voltage $V_{REF}$ by the fourth current sampling switch 76. The first and second switches 70 and 72 open simultaneously at the end of the conductive period of the transistor to which they are attached or connected, whereas the third and fourth switches 74 and 76 close when the first and second switches 70 and 72 open. The control signals to activate the switches 70, 72, 74 and 76 may be generated on timing lines 82*a* and 82*b* by the timing circuit 68 in a manner similar to the control signals for the sampling switches. Thus, at the end of the conduction period to which the current sampler is connected, a voltage representing the inductor current is supplied to the current sampling terminal 80. Two current sampling circuits provide the voltage measurements $V_{I1}$ and $V_{I2}$ which are representative of the currents $I_1$ and $I_2$, respectively.

The voltage and current measurements may be made at a variety of discrete times. For example, a single current measurement could be made at the middle of the NMOS conduction period. However, by sampling the voltage and current just prior to the end of the conduction periods of the first transistor 40 and the second transistor 42, the sampled signals provide the best estimate for the average values of the inductor current and capacitor voltage and are taken when the switching noise is at a minimum.

Referring to FIG. 9, the sampled data $V_1$, $V_2$, $V_{I1}$, and $V_{I2}$ on sampling terminals 58*a*, 58*b*, 80*a*, and 80*b* are supplied to the feedback control signal generator 32. The feedback control signal generator uses these signals to generate a control voltage $V_{control}$ on the duty cycle control line 34. This control voltage is used by the pulse generator 18 to modulate the duty cycle of the switching circuit 16 to maintain the average voltage $V_o$ at the output terminal at a substantially constant level. $V_o$ andand 172*a* and The feedback control signal generator can determine $V_{control}$ according to various algorithms. For example, sampling terminals 58*a*, 58*b* and 80*a*, 80*b* may be connected to switch capacitor circuits 170*a* and 170*b*, respectively, to effectively combine and average the sampled voltages $V_1$, $V_2$ and $V_{I1}$, $V_{I2}$ to generate the average values $V_o$ and $V_{IO}$, respectively. The averaged value $V_{IO}$ is scaled by a constant $K_I$ by amplifier 172*b* respectively. The averaged voltage $V_o$ is compared to a reference voltage $V_{ref}$ by a first summing circuit 174. The difference between the averaged voltage $V_o$ and the reference voltage $V_{ref}$ is scaled by a constant $K_V$ by amplifier 172*a*. In addition, the difference between the averaged voltage $V_o$ and the reference voltage $V_{ref}$ is integrated by an integrator 176 to generate an integrated voltage $V_{int}$. Finally, the three inputs $K_V K_0$, $K_I I_0$ and $V_{int}$ are combined by a second summing circuit 178 to generate the control signal $V_{control}$.

Returning to FIG. 2, a significantly simplified pulse modulator 18 is shown. The pulse modulator 18 converts the control voltage $V_{control}$ on the duty cycle control line 34 into a timing voltage waveform on a timing line 104. The pulse modulator 18 includes a ramp generator 100 and a comparator 102. Referring to FIG. 10, the output of the ramp generator is a saw tooth wave having a frequency of $1/T_S$, a minimal voltage of $V_{min}$ and a maximum voltage of $V_{max}$. The comparator compares the control voltage $V_{control}$ to the ramp voltage $V_{ramp}$ and outputs a high voltage on the timing line if $V_{control}$ is greater than $V_{ramp}$, and a low voltage on the timing line if $V_{control}$ is less than $V_{ramp}$. Returning to FIG. 2, the timing voltage waveform on the timing line 104 is sent to the timing circuit 68. The timing circuit 68 may output the timing voltage waveform sampling voltage $V_{sample}$ on the sampling control lines 66*a* and 66*b*. The timing circuit 68 may generate a switching voltage $V_S$ on the switching lines 48*a* and 48*b* which is offset from the sampling voltage waveform $V_{sample}$ by a small delay $T_D$. Thus, the sampling switches (e.g., switches 62*a*, 62*b*, 64*a* and 64*b*) are triggered slightly before the transistors 40 and 42 in the switching circuit 16.

If $V_{control}$ increases, the duty cycle D of switching voltage $V_S$ decreases. On the other hand, if control voltage $V_{control}$ decreases, duty cycle D increases. Therefore, the feedback circuit 28 is able to measure the output voltage $V_{out}$ and inductor current $I_{LF}$ at discrete times, use this data to calculate the average voltage $V_0$ and the average current $I_0$, and use the average current and voltage to modulate the duty cycle of switching voltage $V_S$ to ensure that the output voltage remains substantially constant. Since all of the components of the feedback controller may be designed using switches and capacitors, most of the switching regulator may be fabricated utilizing conventional CMOS techniques. In addition, because the voltage and current are sampled at discrete times, the system is more compatible with conventional digital designs such as digital timing circuits.

Referring to FIG. 11A, in another embodiment, a voltage sampling capacitor 60' is connected to a reference voltage $V_{REF}$ rather than to ground. This reduces the amount of charge stored on the capacitor.

Referring to FIG. 11B, in another embodiment, sampling circuitry 30" is constructed with a bottom plate sampling topology. The bottom plate of a voltage sampling capacitor 60" is connected to the output terminal 24 by a first sampling switch 112 and to a reference voltage $V_{ref}$ by a second sampling switch 114. The top plate of the voltage sampling capacitor 60" is connected to the same reference voltage $V_{ref}$ by a third sampling switch 116 and to a voltage sampling terminal 58" by a fourth sampling switch 118. The first switch 112 and the third switch 116 are closed during the conduction period before the voltage measurement, whereas the second switch 114 and the fourth switch 118 are open during the conduction period before the voltage measurement. Bottom plate sampling reduces the sampling error caused by parasitic capacitance and charge injection from the switches.

One possible implementation of the feedback circuitry 28', including sampling circuitry and a feedback control signal generator, is shown in FIG. 12. The feedback circuitry 28' includes voltage sampling cells 130 to measure the output voltages $V_{out}$, current sampling cells 132 to measure a voltage $V_{DS}$ which represents the current passing through the inductor, and an integrator 134 which is associated with voltage sampling cells 136 to generate an integral of the difference between the difference between the measured and desired output voltage. The voltages from the voltage sampling cells 130, the current sampling cells 132, the integrator 134, and a ramp generator 138, are combined by a main summing amplifier 140. The output of the main summing amplifier 140 is sent to a comparator 142 which generates the sampling voltage. The elements in the feedback circuitry are driven by a timing signal generator 144 which generators the following signals: nmos_on/phi_nmos is high when the NMOS transistor is on; pmos_on/phi_pmos is high when the PMOS transistor is on; not_pmos_on is high when the PMOS transistor is off; nmos_even is high every other time the NMOS transistor is on; and nmos_odd is high every other time the NMOS transistor is on, but is in quadrature with the nmos_even signal. All of these signals switch low just before the gate drive buffers for their respective transistors begin switching. The voltage sampling cells include two sample cells for measuring the voltage at the end of the NMOS conduction period. One sampling cell is connected to the main summing amplifier while the other sampling cell is sampling. Thus, the main summing amplifier can use the NMOS sample take in the previous period to calculate the duty cycle to be used in the current period. Although the switches are illustrated as JFET transistors, they may be implemented as NMOS and PMOS transistors.

In brief, the feedback circuitry 28' calculates the duty cycle according to the following equation:

$$DutyCycle = \frac{f}{2I_{PWM}}\left(C_V(V_{ERROR}^{PMOS} + V_{ERROR}^{NMOS}) + (C_{PMOS} V_{DS}^{PMOS} + C_{NMOS} V_{DS}^{NMOS}) + C_I \frac{C_S}{C_F} \sum_0^N (V_{ERROR}^{PMOS} + V_{ERROR}^{NMOS})\right)$$

where f is the sampling frequency, $I_{pwm}$ is the current from each side of the ramp generator, CV is the capacitance of the voltage sampling capacitor (e.g., 2.8 pF), $C_{PMOS}$ is the capacitance of the current sampling capacitor for the PMOS transistor (e.g., 4 pF), $C_{NMOS}$ is the capacitance of the current sampling capacitor for the NMOS transistor (e.g., 8 pF), $C_I$ is the capacitance of the output sampling capacitor in the integrator (e.g., 0.8 pF), Cs is the capacitance of the sampling capacitor (e.g., 1 pF), CF is the capacitance of the integrating capacitor (e.g., 3.5 pF), $V_{DS}^{PMOS}$ is the voltage measurement which is representative of the output current during the PMOS conduction period, $V_{ERROR}^{PMOS}$ is the output voltage measurement during the PMOS conduction period, $V_{ERROR}^{NMOS}$ is the output voltage measurement during the NMOS conduction period, and $V_{DS}^{NMOS}$ is the voltage measurement which is representative of the ouput current during the NMOS conduction period.

Referring to FIG. 13, in another embodiment, the analog components of the feedback control signal generator 32 are replaced with a microprocessor 120. Specifically, sampling terminals 58a, 58b, 80a and 80b are each connected to an analog-to-digital converter (ADC) 122 to convert the sampled voltage or current into a digital signal which is sent to the microprocessor 120. The microprocessor 120 may be a combination of hardware, software, and firmware. The microprocessor 120 calculates a duty cycle signal which is converted by a digital-to-analog converter (DAC) 124 into a control voltage $V_{control}$. The microprocessor 120 may be programmed to calculate the average voltage $V_0$ and the average current $V_{I0}$ from the sampled measurements $V_1, V_2, V_{I1}$ and $V_{I2}$. Then, the microprocessor 120 may calculate a new control voltage from the average voltage $V_0$ and average current $V_{I0}$. For example, the microprocessor may store a control voltage used from the previous cycle, $V_{old}$, and calculate a new control voltage $V_{new}$ according to a preset equation.

Referring to FIG. 14, in another embodiment, the signal control generator and pulse modulator functions are combined and implemented directly by the microprocessor 120'. The microprocessor 120' is connected directly to switching line 48. The microprocessor may be configured to calculate a duty cycle from the average voltage $V_0$ and average current 10.

What is claimed is:

1. A voltage regulator having an input terminal to be coupled to an input voltage source and an output terminal to be coupled to a load, comprising:
   a power switch to alternately couple and decouple the input terminal to the output terminal;
   a filter disposed between the input terminal and the output terminal to provide a substantially DC voltage at the output terminal;
   a sampling circuit to make and capture a measurement of an electrical characteristic of the voltage regulator at a discrete moment of time; and
   a feedback circuit coupled to the sampling circuit and the power switch, the feedback circuit configured to receive the captured measurement and use the measurement to control the power switch to maintain the DC voltage substantially constant.

2. The voltage regulator of claim 1, wherein the electrical characteristic is a voltage at the output terminal.

3. The voltage regulator of claim 2, wherein the sampling circuit includes a capacitor, a first sampling switch connecting the capacitor to the output terminal, and a second sampling switch connecting the capacitor to the feedback circuit, so that the measurement is made when the first sampling switch opens, is stored as a charge on the capacitor, and is provided to the feedback circuit when the second sampling switch closes.

4. The voltage regulator of claim 1, wherein the electrical characteristic is a current passing through the filter.

5. The voltage regulator of claim 4, wherein the sampling circuit includes a capacitor, a first sampling switch connecting a first plate of the capacitor to a first terminal of the power switch, a second sampling switch connecting a second plate of the capacitor to a second terminal of the power switch, and a third sampling switch connecting the capacitor to the feedback circuit, so that the measurement is made when the first and second sampling switches open, is stored as a charge on the capacitor, and is provided to the feedback circuit when the third sampling switch closes.

6. The voltage regulator of claim 1, wherein the sampling circuit makes the measurement just prior to the power switch closing.

7. The voltage regulator of claim 1, wherein the sampling circuit makes the measurement just prior to the power switch opening.

8. The voltage regulator of claim 1, wherein the sampling circuit makes a first measurement of the electrical characteristic when the power switch is closed and makes a second measurement of the electrical characteristic when the power switch is open.

9. The voltage regulator of claim 8, wherein the feedback circuit uses an average of the first and second measurements to control the power switch.

10. A voltage regulator having an input terminal to be coupled to an input voltage source and an output terminal to be coupled to a load, comprising:

a power switch to alternately couple and decouple the input terminal to the output terminal;

a filter disposed between the input terminal and the output terminal to provide a substantially DC voltage at the output terminal;

a sampling circuit to make measurements of an electrical characteristic of the voltage regulator at discrete moments of time; and a feedback circuit coupled to the sampling circuit and the power switch, the feedback circuit configured to use the measurements to control the power switch to maintain the DC voltage substantially constant;

wherein the sampling circuitry includes a capacitor, a first sampling switch connecting the capacitor to an electrical path between the input terminal and the output terminal, and a second sampling switch connecting the capacitor to the feedback circuit.

11. The voltage regulator of claim 10, wherein the second sampling switch is configured to close when the first sampling switch opens.

12. The voltage regulator of claim 11, wherein the first sampling switch is configured to open just before the power switch closes.

13. The voltage regulator of claim 11, wherein the first sampling switch is configured to open just before the power switch opens.

14. The voltage regulator of claim 10, wherein the power switch is driven by a switching voltage waveform and the sampling switches are driven by a sampling voltage waveform, and the voltage regulator further comprises a timing circuit to delay the switching voltage waveform relative to the sampling voltage waveform.

15. The voltage regulator of claim 14, wherein the switching voltage waveform is delayed relative to the sampling voltage waveform by approximately the time constant delay of the sampling circuit.

16. The voltage regulator of claim 1, wherein the feedback circuit generates a control signal, and the voltage regulator further comprises a pulse modulator connected to the feedback circuit and the power switch to set the duty cycle in response to the control signal.

17. The voltage regulator of claim 16, wherein the feedback circuit includes one or more switched-capacitor circuits coupled to the sampling circuit to convert the measurement into a charge and to generate the control signal from the charge.

18. The voltage regulator of claim 16, wherein the feedback circuit includes an analog-to-digital converter (ADC) coupled to the sampling circuit to convert the measurement into a digital signal, and a processor coupled to the ADC to generate the control signal from the digital signal.

19. The voltage regulator of claim 1, wherein the power switch includes a first switch connecting the input terminal to an intermediate terminal and a rectifier connecting the intermediate terminal to ground, and the output filter is connected between the intermediate terminal and the output terminal.

20. The voltage regulator of claim 19, wherein the rectifier is a second switch which connects the intermediate terminal to ground.

21. A voltage regulator having an input terminal to be coupled to an input voltage source and an output terminal to be coupled to a load, comprising:

a power switch to alternately couple and decouple the input terminal to the output terminal with a variable duty cycle;

a filter disposed between the switch and the output terminal to provide a substantially DC voltage at the output terminal;

a sampling circuit to make a measurement of a current passing through the output filter, the sampling circuit including a capacitor, a first sampling switch connecting a first plate of the capacitor to a first terminal of the power switch, a second sampling switch connecting a second plate of the capacitor to a second terminal of the power switch, and a third sampling switch connecting the capacitor to a sampling terminal; and a feedback circuit connected to the sampling terminal and the power switch, the feedback circuit configured to use the measurement to control the duty cycle to maintain the DC voltage at a substantially constant level.

22. A DC-DC converter having an input terminal to be coupled to an input voltage source and an output terminal to be coupled to a load, comprising:

a power switch to alternately couple and decouple the input terminal to the output terminal with a variable duty cycle;

a pulse modulator connected to the power switch to set the duty cycle in response to a control signal;

a filter disposed between the power switch and the output terminal to provide a substantially DC voltage at the output terminal;

a first voltage sampling circuit to measure a first voltage at the output terminal at a first discrete moment of time just prior to the power switch coupling the input terminal to the output terminal;

a second voltage sampling circuit to measure a second voltage at the output terminal at a second discrete moment of time just prior to the power switch decoupling the input terminal from the output terminal;

a first current sampling circuit to measure a first current passing through the filter at the first discrete moment of time;

a second current sampling circuit to measure a second current passing through the filter at the second discrete moment of time;

a feedback circuit connected to the sampling circuits and the pulse modulator, the feedback circuit configured to use the measured voltages and currents to generate the control signal and maintain the DC voltage at a substantially constant level.

23. A voltage regulator having an input terminal to be coupled to an input voltage source and an output terminal to be coupled to a load, comprising:

a power switch to alternately couple and decouple the input terminal to the output terminal;

a filter disposed between the input terminal and the output terminal to provide a substantially DC voltage at the output terminal;

a sampling circuit to make a measurement of a voltage at the output terminal regulator at a discrete moment of time, the sampling circuit including a capacitor, a first sampling switch connecting the capacitor to the output terminal, and a second sampling switch, so that the measurement is made when the first sampling switch opens and is stored as a charge on the capacitor; and a feedback circuit coupled to the second sampling switch of the sampling circuit, so that the measurement is provided to the feedback circuit when the second sampling switch closes, the feedback circuit configured to use the measurement to control the power switch to maintain the DC voltage substantially constant.

24. A voltage regulator having an input terminal to be coupled to an input voltage source and an output terminal to be coupled to a load, comprising:

a power switch to alternately couple and decouple the input terminal to the output terminal;

a filter disposed between the input terminal and the output terminal to provide a substantially DC voltage at the output terminal;

a sampling circuit to make a measurement of a current passing through the filter at discrete moments of time, the sampling circuit including a capacitor, a first sampling switch connecting a first plate of the capacitor to a first terminal of the power switch, a second sampling switch connecting a second plate of the capacitor to a second terminal of the power switch, and a third sampling switch connected to the capacitor to the feedback circuit, so that the measurement is made when the first and second sampling switches open and is stored as a charge on the capacitor; and a feedback circuit coupled to the third sampling switch of the sampling circuit so that the measurement is provided to the feedback circuit when the third sampling switch closes, the feedback circuit coupled to the power switch and configured to use the measurement to control the power switch to maintain the DC voltage substantially constant.

25. The voltage regulator of claim 1, wherein the feedback circuit uses the measurement to control a duty cycle of the power switch.

\* \* \* \* \*

UNITED STATES PATENT AND TRADEMARK OFFICE
CERTIFICATE OF CORRECTION

PATENT NO.     : 6,020,729
DATED          : FEBRUARY 1, 2000
INVENTOR(S)    : STRATAKOS ET AL.

It is certified that error appears in the above-identified patent and that said Letters Patent is hereby corrected as shown below:

On the title page: Item [56]

U.S. PATENT DOCUMENTS:
insert
-- 4,357,572   11/1982   Andersen et al.   323/286
   5,514,947   5/1996    Berg              323/282
   5,552,694   9/1996    Appeltans         323/222
   5,578,916   11/1996   Muterspaugh       323/267
   5,675,240   10/1997   Fujisawa          323/282
   5,677,619   10/1997   Doluca            323/282
   5,751,140   5/1998    Canter            323/282--

Signed and Sealed this

Thirtieth Day of January, 2001

Attest:

*Attesting Officer*

Q. TODD DICKINSON

*Director of Patents and Trademarks*

(12) EX PARTE REEXAMINATION CERTIFICATE (8727th)
United States Patent
Stratakos et al.

(10) Number: US 6,020,729 C1
(45) Certificate Issued: Dec. 6, 2011

(54) DISCRETE-TIME SAMPLING OF DATA FOR USE IN SWITCHING REGULATORS

(75) Inventors: Anthony J. Stratakos, Fremont, CA (US); David B. Lidsky, Oakland, CA (US); William A. Clark, Fremont, CA (US)

(73) Assignee: Volterra Semiconductor Corporation, Fremont, CA (US)

Reexamination Request:
No. 90/009,403, Feb. 12, 2009

Reexamination Certificate for:
Patent No.: 6,020,729
Issued: Feb. 1, 2000
Appl. No.: 08/991,394
Filed: Dec. 16, 1997

Certificate of Correction issued Jan. 30, 2001.

(51) Int. Cl.
*H02M 3/156* (2006.01)
*H02M 3/04* (2006.01)

(52) U.S. Cl. ........................................ 323/283; 323/284

(58) Field of Classification Search ........................ None
See application file for complete search history.

(56) References Cited

To view the complete listing of prior art documents cited during the proceeding for Reexamination Control Number 90/009,403, please refer to the USPTO's public Patent Application Information Retrieval (PAIR) system under the Display References tab.

*Primary Examiner*—Linh M. Nguyen

(57) ABSTRACT

A voltage regulator with a switch to alternately couple and decouple an input terminal to an output terminal with a variable duty cycle and a filter disposed between the input terminal and the output terminal to provide a substantially DC voltage at the output terminal. A sampling circuit makes measurements of an electrical characteristic of the voltage regulator at discrete moments of time, such as just before the opening and closing of the switch. A feedback circuit is coupled to the sampling circuit and the switch, and is configured to use the measurements to control the duty cycle to maintain the DC voltage substantially constant. The feedback circuit uses the switch as the resistive element in order to measure the current passing through the voltage regulator.

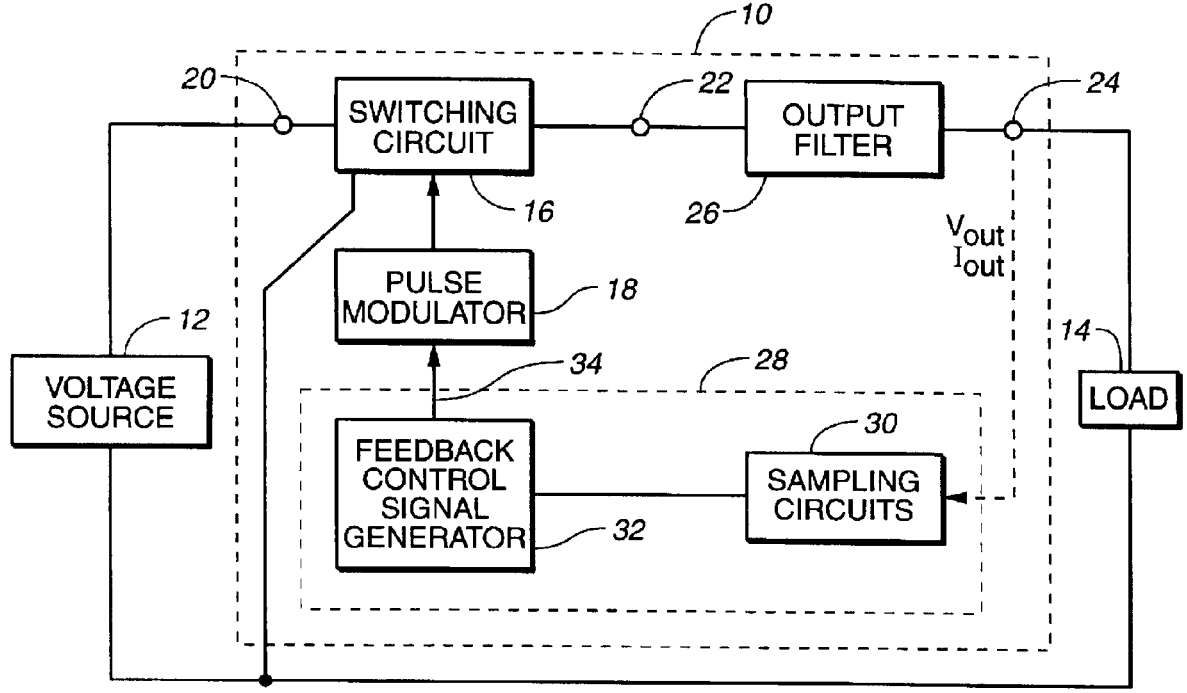

US 6,020,729 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4, 16, 18-20 and 25 is confirmed.

New claims 26-169 are added and determined to be patentable.

Claims 3, 5-15, 17 and 21-24 were not reexamined.

*26. A voltage regulator having an input terminal to be coupled to an input voltage source and an output terminal to be coupled to a load, comprising:*
  *a power switch to alternately couple and decouple the input terminal to the output terminal with a variable duty cycle;*
  *a filter disposed between the input terminal and the output terminal to provide a substantially DC voltage at the output terminal;*
  *a sampling circuit to make and capture a measurement of an electrical characteristic of the voltage regulator at a discrete moment of time that is dependent on the variable duty cycle; and*
  *a feedback circuit coupled to the sampling circuit and the power switch, the feedback circuit configured to receive the captured measurement and use the measurement to control the power switch to maintain the DC voltage substantially constant.*

*27. The voltage regulator of claim 26 wherein the discrete moment occurs at an offset from a coupling or decoupling of the power switch.*

*28. The voltage regulator of claim 27 wherein the offset depends on the variable duty cycle.*

*29. The voltage regulator of claim 28 wherein the offset is such that the measurement is made and captured in the middle of a conduction period that extends between coupling and decoupling of the power switch.*

*30. The voltage regulator of claim 29 wherein the offset is such that the measurement is made and captured in the middle of the conduction period of a device that connects the output terminal to ground.*

*31. The voltage regulator of claim 30 wherein the device is a transistor.*

*32. The voltage regulator of claim 30 wherein the device is a diode.*

*33. The voltage regulator of claim 27 wherein the offset is a delay between the discrete moment of time and subsequent coupling or decoupling of the power switch.*

*34. The voltage regulator of claim 27 wherein the power switch alternately couples and decouples with a period Ts and the offset is small in comparison with period Ts.*

*35. The voltage regulator of claim 27 wherein the offset is such that the measurement in combination with at least one additional measurement provides an estimate for an average value of the electrical characteristic.*

*36. The voltage regulator of claim 27 wherein the offset is such that the discrete moment occurs in the middle of a conduction period of a device in the power switch.*

*37. The voltage regulator of claim 36 wherein the device is a transistor or diode that provides rectification.*

*38. The voltage regulator of claim 27 wherein the offset is such that the discrete moment occurs just prior to the end of a conduction period.*

*39. The voltage regulator of claim 27 wherein the offset is such that the measurement is made and captured slightly before the power switch couples or decouples the input terminal to the output terminal.*

*40. The voltage regulator of claim 27 wherein the offset is approximately equal to a time required by the sampling circuit to make and capture the measurement.*

*41. The voltage regulator of claim 26 wherein the measurement is made and captured in the middle of a conduction period that extends between coupling and decoupling of the power switch.*

*42. The voltage regulator of claim 26 wherein the power switch comprises a first transistor that couples and decouples the input terminal to an intermediate terminal and a second transistor that couples and decouples the intermediate terminal to ground.*

*43. The voltage regulator of claim 42 wherein the filter includes an inductor disposed between the intermediate terminal and the output terminal.*

*44. The voltage regulator of claim 42 wherein the sampling circuit operates to make and capture a first measurement at a first discrete moment when the first transistor is in conducting mode, and to make and capture a second measurement at a second discrete moment when the second transistor is in a conducting mode.*

*45. The voltage regulator of claim 43 wherein during a first time interval when the first transistor is in a conducting mode, the sampling circuit operates to make and capture a first measurement corresponding to an output voltage and a second measurement corresponding to a current through the inductor; during a second time interval when the second transistor is in a conducting mode, the sampling circuit operates to make and capture a third measurement corresponding to an output voltage and a fourth measurement corresponding to a current through the inductor.*

*46. The voltage regulator of claim 42 wherein the sampling circuit operates to make and capture a first plurality of measurements at a first plurality of discrete moments when the first transistor is in a conducting mode, and to make and capture a second plurality of measurements at a second plurality of discrete moments when the second transistor is in a conducting mode.*

*47. The voltage regulator of claim 42 wherein the measurement is made and captured in the middle of a conductive period of the second transistor.*

*48. The voltage regulator of claim 26 further comprising a timing circuit that provides a first signal to the power switch to control the variable duty cycle and provides a second signal to the sampling circuit to control the making and capturing of the measurement.*

*49. The voltage regulator of claim 26 wherein the feedback circuit receives an additional captured measurement from another discrete moment of time and uses the captured measurement in combination with the additional captured measurement to control the power switch.*

*50. The voltage regulator of claim 49 wherein the feedback circuit averages the captured measurement and the additional measurement.*

51. The voltage regulator of claim 26 wherein the filter includes an inductor and the electrical characteristic is a current in the inductor.

52. The voltage regulator of claim 51 wherein the measurement is captured as a voltage on a capacitor.

53. The voltage regulator of claim 51 wherein the measurement is of a voltage across a resistive element.

54. The voltage regulator of claim 53 wherein the resistive element is disposed between the input terminal and the output terminal.

55. The voltage regulator of claim 26 wherein the feedback circuit includes an analog to digital converter.

56. The voltage regulator of claim 55 wherein the feedback circuit includes digital circuitry.

57. The voltage regulator of claim 26 wherein the feedback circuit is implemented using switched-capacitor based circuitry.

58. The voltage regulator of claim 56 wherein the feedback circuit includes a microprocessor which controls the duty cycle of the power switch.

59. The voltage regulator of claim 56 wherein the feedback circuit includes a microprocessor and the duty cycle of the power switch is controlled using microprocessor firmware or software.

60. The voltage regulator of claim 51 further comprising a voltage sampling circuit to make and capture a plurality of measurements of an output voltage at a plurality of discrete moments of time.

61. The voltage regulator of claim 60 wherein the plurality of measurements are averaged to obtain an average output voltage.

62. The voltage regulator of claim 60 wherein the plurality of discrete moments of time occur within a switching cycle of the power switch.

63. The voltage regulator of claim 42 wherein the discrete moment of time occurs at the end of the conduction interval of the first transistor.

64. The voltage regulator of claim 63 wherein the sampling circuit makes and captures another measurement of the electrical characteristic at another discrete moment of time at the end of the conduction interval of the second transistor, further comprising combining the measurement and the other measurement.

65. The voltage regulator of claim 64 wherein the electrical characteristic is the output voltage.

66. The voltage regulator of claim 64 wherein the filter includes an inductor, and the electrical characteristic is current in the inductor.

67. The voltage regulator of claim 26 wherein the filter includes an inductor, and the sampling circuit makes and captures a measurement of current in the inductor, further comprising a circuit to make a measurement of an output voltage.

68. The voltage regulator of claim 67 wherein the duty cycle is dependent on the current in the inductor and the output voltage.

69. The voltage regulator of claim 68 further comprising an integrator that generates an integrated voltage from a measurement of the output voltage, the duty cycle being further dependent on the integrated voltage.

70. The voltage regulator of claim 69 wherein the duty cycle is dependent on at least one factor that is scaled by a gain.

71. The voltage regulator of claim 70 wherein the duty cycle is dependent on at least two factors that are each separately scaled.

72. The voltage regulator of claim 71 wherein the output voltage is scaled to provide a scaled output voltage, the inductor current is separately scaled to provide a scaled inductor current, and the scaled output voltage, the scaled inductor current, and the integrated voltage are combined to provide a control signal, the duty cycle depending on the control signal.

73. The voltage regulator of claim 70 wherein the at least one factor is scaled by an amplifier.

74. The voltage regulator of claim 26 wherein the sampling circuit makes and captures a measurement at a discrete moment of time when switching noise is at or near a minimum.

75. The voltage regulator of claim 26 wherein the sampling circuit makes and captures a plurality of measurements of the electrical characteristic, the sampling circuit making and capturing one or more measurements per switching cycle.

76. A voltage regulator having an input terminal to be coupled to an input voltage source and an output terminal to be coupled to a load, comprising:

a power switch to alternately couple and decouple the input terminal to the output terminal with a variable duty cycle, the power switch including a first transistor intermittently connecting the input terminal to an intermediate terminal and a second transistor intermittently connecting the intermediate terminal to ground;

a filter disposed between the input terminal and the output terminal to provide a substantially DC voltage at the output terminal;

a sampling circuit to make and capture a measurement of an electrical characteristic of the voltage regulator at a discrete moment of time that is dependent on the variable duty cycle; and a feedback circuit coupled to the sampling circuit and the power switch, the feedback circuit configured to receive the captured measurement and use the measurement to control the power switch to maintain the DC voltage substantially constant.

77. The voltage regulator of claim 76 wherein the power switch and the feedback circuit are implemented using the same fabrication techniques.

78. The voltage regulator of claim 76 wherein the power switch and the feedback circuit are implemented using CMOS fabrication.

79. The voltage regulator of claim 76 wherein the feedback circuit includes an analog to digital converter.

80. The voltage of claim 79 wherein the feedback circuit includes digital circuitry.

81. The voltage regulator of claim 79 wherein the feedback circuit includes a microprocessor and the duty cycle of the power switch is controlled by the microprocessor.

82. The voltage regulator of claim 79 wherein the feedback circuit includes a microprocessor and the duty cycle of the power switch is controlled using microprocessor firmware or software.

83. The voltage regulator of claim 76 wherein the filter includes an inductor and the feedback circuit uses a measured output voltage and a measured voltage corresponding to a current through the inductor to determine the duty cycle.

84. The voltage regulator of claim 76 wherein the filter includes an inductor and the electrical characteristic is a current in the inductor.

85 The voltage regulator of claim 76 wherein the power switch has a period Ts and the sampling circuit makes and captures measurements of the electrical characteristic at one or more discrete moments of time during each period Ts.

86. The voltage regulator of claim 85 wherein the sampling circuit makes and captures measurements of the electrical characteristic at two or more discrete moments of time during each period Ts.

87. The voltage regulator of claim 76 wherein the discrete moment of time is offset by a delay between the discrete moment of time and subsequent coupling of the power switch.

88. The voltage regulator of claim 76 wherein the discrete moment of time is offset by a delay between the discrete moment of time and subsequent decoupling of the power switch.

89. The voltage regulator of claim 76 wherein the measurement is made and captured in the middle of a conductive period of the second transistor.

90. The voltage regulator of claim 76 wherein the filter is coupled between the intermediate terminal and the output terminal, and wherein the filter includes an inductor.

91. The voltage regulator of claim 90 wherein the sampling circuit operates to make and capture a first measurement at a first discrete moment when the first transistor is in a conducting mode, and to make and capture a second measurement at a second discrete moment when the second transistor is in a conducting mode.

92. The voltage regulator of claim 90 wherein during a first time interval when the first transistor is in a conducting mode the sampling circuit operates to make and capture a first measurement corresponding to an output voltage and a second measurement corresponding to a current through the inductor; during a second time interval when the second transistor is in a conducting mode, the sampling circuit operates to make and capture a third measurement corresponding to an output voltage and a fourth measurement corresponding to a current through the inductor.

93. The voltage regulator of claim 90 wherein the sampling circuit operates to make and capture a first plurality of measurements at a first plurality of discrete moments when the first transistor is in a conducting mode, and to make and capture a second plurality of measurements at a second plurality of discrete moments when the second transistor is in a conducting mode.

94. The voltage regulator of claim 90 wherein the measurement is made and captured in the middle of a conductive period of the second transistor.

95. The voltage regulator of claim 90 further comprising a timing circuit that provides a first signal to the power switch to control the variable duty cycle and provide a second signal to the sampling circuit to control the making and capturing of the measurement.

96. The voltage regulator of claim 90 wherein the feedback circuit receives an additional captured measurement from another discrete moment of time and uses the captured measurement in the combination with the additional captured measurement to control the power switch.

97. The voltage regulator of claim 96 wherein the feedback circuit averages the captured measurement and the additional measurement.

98. The voltage regulator of claim 90 wherein the electrical characteristic is a current in the inductor.

99. The voltage regulator of claim 98 wherein the measurement is captured as a voltage on a capacitor.

100. The voltage regulator of claim 98 wherein the current is inferred by a voltage drop across a resistive element.

101. The voltage regulator of claim 100 wherein the resistive element is coupled between the input terminal and the output terminal.

102. The voltage regulator of claim 90 wherein the feedback circuit includes an analog to digital converter.

103. The voltage regulator of claim 102 wherein the feedback circuit includes digital circuitry.

104. The voltage regulator of claim 90 wherein the feedback circuit is implemented using switched-capacitor based circuitry.

105. The voltage regulator of claim 90 wherein the feedback circuit includes a microprocessor which controls the duty cycle of the power switch.

106. The voltage regulator of claim 90 wherein the feedback circuit includes a microprocessor and the duty cycle of the power switch is controlled using microprocessor firmware or software.

107. The voltage regulator of claim 90 wherein the sampling circuit makes and captures a measurement of current in the inductor, further comprising a voltage sampling circuit to make and capture a plurality of measurements of an output voltage at a plurality of discrete moments of time.

108. The voltage regulator of claim 107 wherein the plurality of measurements are averaged to obtain an average output voltage.

109. The voltage regulator of claim 108 wherein the plurality of discrete moments of time occur within a switching cycle of the power switch.

110. The voltage regulator of claim 90 wherein the sampling circuit makes and captures a measurement of current in the inductor, further comprising a circuit to make a measurement of an output voltage.

111. The voltage regulator of claim 110 wherein the duty cycle is dependent on the current in the inductor and the output voltage.

112. The voltage regulator of claim 111 further comprising an integrator that generates an integrated voltage from a measurement of the output voltage, the duty cycle being further dependent on the integrated voltage.

113. The voltage regulator of claim 112 wherein the duty cycle is dependent on at least one factor that is scaled by a gain.

114. The voltage regulator of claim 113 wherein the duty cycle is dependent on at least two factors that are each separately scaled.

115. The voltage regulator of claim 114 wherein the output voltage is scaled to provide a scaled output voltage, the inductor current is separately scaled to provide a scaled inductor current, and the scaled output voltage, the scaled inductor current, and the integrated voltage are combined to provide a control signal, the duty cycle depending on the control voltage.

116. The voltage regulator of claim 113 wherein the at least one factor is scaled by an amplifier.

117. The voltage regulator of claim 90 wherein the sampling circuit makes and captures a measurement at a discrete moment of time when switching noise is at or near a minimum.

118. The voltage regulator of claim 90 wherein the sampling circuit makes and captures a plurality of measurements of the electrical characteristic, the sampling circuit making and capturing one or more measurements per switching cycle.

119. A voltage regulator having an input terminal to be coupled to an input voltage source and an output terminal to be coupled to a load, comprising:
  a power switch to alternately couple and decouple the input terminal to the output terminal;
  a filter disposed between the input terminal and the output terminal to provide a substantially DC voltage at the output terminal, the filter including an inductor;
  a current sampling circuit to make and capture a measurement of an electrical characteristic of the voltage regulator at a discrete moment of time, wherein the electrical characteristic is a current in the inductor, the measurement captured as a voltage on a capacitor; and
a feedback circuit coupled to the sampling circuit and the power switch, the feedback circuit configured to receive the captured measurement and use the measurement to control the power switch to maintain the DC voltage substantially constant.

120. The voltage regulator of claim 119 further comprising a switch that connects a plate of the capacitor to a terminal in the voltage regulator to capture the voltage.

121. The voltage regulator of claim 119 wherein the voltage is a voltage across a resistive element and the current in the inductor is inferred from the voltage.

122. The voltage regulator of claim 121 wherein the resistive element is disposed between the input terminal and the output terminal.

123. The voltage regulator of claim 122 wherein the resistive element is directly connected to a plate of the capacitor.

124. The voltage regulator of claim 121 wherein the resistive element is a resistance of a component of the voltage regulator.

125. The voltage regulator of claim 124 wherein the resistive element is the resistance of a transistor.

126. The voltage regulator of claim 119 wherein a plate of the capacitor is connected to ground.

127. The voltage regulator of claim 119 wherein a plate of the capacitor is connected to a reference voltage.

128. The voltage regulator of claim 119 wherein a plate of the capacitor is connected to an input voltage source.

129. The voltage regulator of claim 119 wherein the discrete moment of time is dependent on a variable duty cycle of the power switch.

130. The voltage regulator of claim 119 wherein the measurement is made and captured in the middle of a conductive period that extends between coupling and decoupling of the power switch.

131. The voltage regulator of claim 119 further comprising a voltage sampling circuit to capture a measurement of an output voltage.

132. The voltage regulator of claim 131 wherein the power switch couples and decouples the input terminal to the output terminal with a variable duty cycle, and the duty cycle is dependent on the current in the inductor and on the output voltage.

133. The voltage regulator of claim 132 further comprising an integrator that generates an integrated voltage from a measurement of the output voltage, the duty cycle being further dependent on the integrated voltage.

134. The voltage regulator of claim 133 wherein the duty cycle is dependent on at least one factor that is scaled by a gain.

135. The voltage regulator of claim 134 wherein the duty cycle is dependent on at least two factors that are each separately scaled.

136. The voltage regulator of claim 135 wherein the output voltage is scaled to provide a scaled output voltage, the current in the inductor is separately scaled to provide a scaled inductor current, and the scaled output voltage, the scaled inductor current, and the integrated voltage are combined to obtain a control signal, the duty cycle depending on the contol signal.

137. The voltage regulator of claim 134 wherein the at least one factor is scaled by an amplifier.

138. The voltage regulator of claim 131 wherein the measurement of the output voltage is made and captured at the discrete moment of time.

139. The voltage regulator of claim 119 further comprising a voltage sampling circuit to make and capture a plurality of measurements of an output voltage at a plurality of discrete moments of time.

140. The voltage regulator of claim 139 wherein the plurality of measurements are averaged to obtain an average output voltage.

141. The voltage regulator of claim 139 wherein the plurality of discrete moments of time occur within a switching cycle of the power switch.

142. The voltage regulator of claim 119 wherein the power switch includes a first transistor intermittently connecting the input terminal to an intermediate terminal, and a second transistor intermittently connecting the intermediate terminal to ground, and wherein the discrete moment of time is at a midpoint of a conduction interval of the second transistor.

143. The voltage regulator of claim 119 wherein the power switch includes a first transistor intermittently connecting the input terminal to an intermediate terminal, and a second transistor intermittently connecting the intermediate terminal to ground, and wherein the discrete moment of time is at the end of the conduction interval of the first transistor.

144. The voltage regulator of claim 143 wherein a second measurement of current in the inductor is made and captured at a second discrete moment of time at the end of the conduction interval of the second transistor, further comprising combining the measurement and the second measurement to obtain an average measurement.

145. The voltage regulator of claim 119 wherein the sampling circuit makes and captures a plurality of measurements of current in the inductor at a plurality of discrete moments of time, and the plurality of measurements are combined.

146. The voltage regulator of claim 119 wherein the feedback circuit further comprises at least one summing circuit.

147. The voltage regulator of claim 121 further comprising a sampling switch disposed between the resistive element and the capacitor.

148. The voltage regulator of claim 147 wherein when the sampling switch is closed, the capacitor is coupled in parallel with the resistive element.

149. The voltage regulator of claim 119 wherein the power switch includes a first transistor intermittently connecting the input terminal to an intermediate terminal, and a second transistor intermittently connecting the intermediate terminal to ground.

150. The voltage regulator of claim 119 wherein the feedback circuit includes an analog to digital converter.

151. The voltage of claim 150 wherein the feedback circuit includes a microprocessor which controls the duty cycle of the power switch.

152. The voltage regulator of claim 150 wherein the feedback circuit includes a microprocessor and the duty cycle of the power switch is controlled using microprocessor firmware or software.

153. The voltage regulator of claim 119 wherein the current sampling circuit makes and captures a plurality of measurements of current, the sampling circuit making and capturing one or more measurements per switching cycle.

154. A voltage regulator having an input terminal to be coupled to an input voltage source and an output terminal to be coupled to a load comprising:
a power switch to alternately couple and decouple the input terminal to the output terminal with a period Ts;
a filter disposed between the input terminal and the output terminal to provide a susbstantially DC voltage at the output terminal;
a sampling circuit to make and capture measurements of an electrical characteristic of the voltage regulator at two or more discrete moments of time during each period Ts; and a feedback circuit coupled to the sampling circuit and the power switch, the feedback circuit configured to receive the measurements and use the measurements to control the power switch to maintain the DC voltage substantially constant.

155. The voltage regulator of claim 154 wherein the power switch includes a first transistor intermittently connecting the input terminal to an intermediate terminal, and a second transistor intermittently connecting the intermediate terminal to ground.

156. The voltage regulator of claim 154 wherein the feedback circuit includes an analog to digital converter.

157. The voltage regulator of claim 156 wherein the feedback circuit includes digital circuitry.

158. The voltage regulator of claim 156 wherein the feedback circuit includes a microprocessor which controls the duty cycle of the power switch.

159. The voltage regulator of claim 156 wherein the feedback circuit includes a microprocessor and the duty cycle of the power switch is controlled using microprocessor firmware or software.

160. The voltage of claim 154 wherein the power switch has a variable duty cycle and at least one of the measurements is made at a discrete moment of time that is dependent on the variable duty cycle.

161. The voltage regulator of claim 154 wherein the filter includes an inductor and the electrical characteristic is current in the inductor.

162. The voltage of claim 161 wherein the electrical characteristic is captured as a voltage on a capacitor.

163. The voltage regulator of claim 154 wherein the electrical characteristic is an output voltage and the filter includes an inductor, further comprising a circuit to make a measurement of current in the inductor.

164. The voltage regulator of claim 163 wherein a duty cycle of the power is dependent on the current in the inductor and the output voltage.

165. The voltage regulator of claim 164 further comprising an integrator that generates an integrated voltage from a measurement of the output voltage, the duty cycle being further dependent on the integrated voltage.

166. The voltage regulator of claim 165 wherein the duty cycle is dependent on at least one factor that is scaled by a gain.

167. The voltage regulator of claim 166 wherein the duty cycle is dependent on at least two factors that are each separately scaled.

168. The voltage regulator of claim 167 wherein the output voltage is scaled to provide a scaled output voltage, the inductor current is separately scaled to provide a scaled inductor current, and the scaled output voltage, the scaled inductor current, and the integrated voltage are combined to provide a control voltage, the duty cycle depending on the control voltage.

169. The voltage regulator of claim 168 wherein the at least one factor is scaled by an amplifier.

* * * * *